United States Patent
Terazawa et al.

(10) Patent No.: US 9,285,617 B2
(45) Date of Patent: Mar. 15, 2016

(54) DISPLAY DEVICE

(71) Applicant: MITSUBISHI ELECTRIC CORPORATION, Tokyo (JP)

(72) Inventors: Takeshi Terazawa, Tokyo (JP); Takehisa Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/295,482

(22) Filed: Jun. 4, 2014

(65) Prior Publication Data

US 2014/0362326 A1 Dec. 11, 2014

(30) Foreign Application Priority Data

Jun. 6, 2013 (JP) ................................. 2013-120020

(51) Int. Cl.
*G02F 1/1345* (2006.01)
*G02F 1/1333* (2006.01)

(52) U.S. Cl.
CPC ...... *G02F 1/133308* (2013.01); *G02F 1/13452* (2013.01)

(58) Field of Classification Search
CPC .................. G02F 1/133308; G02F 1/13452
USPC ................................................... 349/58, 150
See application file for complete search history.

(56) References Cited

U.S. PATENT DOCUMENTS

| | | | |
|---|---|---|---|
| 6,342,933 B1* | 1/2002 | Nakamura et al. | 349/58 |
| 2004/0257515 A1* | 12/2004 | Lee | 349/150 |
| 2006/0119760 A1* | 6/2006 | Okuda | 349/58 |
| 2006/0152664 A1* | 7/2006 | Nishio et al. | 349/150 |

FOREIGN PATENT DOCUMENTS

| | | |
|---|---|---|
| JP | 2001-075077 A | 3/2001 |
| JP | 2007-226068 A | 9/2007 |

* cited by examiner

*Primary Examiner* — Thanh-Nhan P Nguyen
(74) *Attorney, Agent, or Firm* — Studebaker & Brackett PC

(57) ABSTRACT

A display device includes: a display element, which has a display area and a peripheral area; a flexible substrate, which has flexibility and which is arranged in the peripheral area of the display element, and on which a driving IC supplying a signal to the display area is mounted; a first frame, which is arranged at a display surface-side of the display element; and a second frame, which is engaged with the first frame to thus hold the display element and the flexible substrate, wherein the display element has a connection part connecting with the flexible substrate, and wherein the first frame provided with a flexible substrate holding member that is located at a position, which face a vicinity of the connection part and is different from a position corresponding to the driving IC mounted on the flexible substrate.

9 Claims, 3 Drawing Sheets

FIG.8 -BACKGROUND ART-

DISPLAY DEVICE

CROSS-REFERENCE TO RELATED APPLICATION

This application claims priority from Japanese Patent Application No. 2013-120020 filed on Jun. 6, 2013, the entire subject matter of which is incorporated herein by reference.

TECHNICAL FIELD

This disclosure relates to a display device having a display element.

BACKGROUND

A display element of a general liquid crystal display device is configured by a TFT array substrate, which has a display area configured by a plurality of vertical wirings and horizontal wirings formed on the substrate and has wirings arranged to extend to a peripheral area so as to transmit signals to the respective wirings of the display area, and a counter substrate, which is arranged to face the display area of the TFT array substrate, and liquid crystals between the TFT array substrate and the counter substrate being overlapped with each other. A flexible substrate having a driving IC mounted thereon is connected to a mounting terminal part of the wirings in the peripheral area of the TFT array substrate to transmit an output signal from a circuit substrate to the display area.

In case of adopting the above-described connection method, the driving IC generates heat upon driving and the characteristics of the driving IC or liquid crystals are thus deteriorated due to the heat, so that display unevenness may be caused. Therefore, in order to radiate the heat generated from the driving IC, a thermally-conductive member, which contains a filler having high heat conductivity, is interposed between the driving IC mounted on the flexible substrate and a frame supporting a display panel. Accordingly, the heat is thus transferred to the frame, so that a temperature increase of the driving IC is prevented or suppressed (for example, refer to Patent Document JP-A-2007-226068).

SUMMARY

However, in cast that the driving IC is arranged with being contacted to the thermally-conductive member, the flexible substrate having the driving IC mounted thereon is deformed, so that stress may be caused. The stress is applied to the mounting terminal part of the TFT array substrate to thus deform the TFT array substrate, so that a gap interval between the TFT array substrate and the counter substrate is not uniform and the display unevenness may be thus caused.

This disclosure provides a technology to suppress deformation of a flexible substrate a driving IC mounted thereon, which is mounted on a TFT array substrate of a liquid crystal display device, to reduce a force with which the flexible substrate deforms the TFT array substrate and to radiate heat, which is generated from the driving IC mounted on the flexible substrate, thereby suppressing display unevenness.

A display device of this disclosure includes: a display element, which has a display area and a peripheral area; a flexible substrate, which has flexibility and which is arranged in the peripheral area of the display element, and on which a driving IC supplying a signal to the display area is mounted; a first frame, which is arranged at a display surface-side of the display element; and a second frame, which is engaged with the first frame to thus hold the display element and the flexible substrate, wherein the display element has a connection part connecting with the flexible substrate, and wherein the first frame provided with a flexible substrate holding member that is located at a position, which face a vicinity of the connection part and is different from a position corresponding to the driving IC mounted on the flexible substrate.

According to this disclosure, in the display device having the flexible substrate holding member, the deformation of the flexible substrate having flexibility is suppressed to reduce the force with which the flexible substrate deforms the display element. Also, the heat that is generated from the driving IC mounted on the flexible substrate is radiated. As a result, the display unevenness is suppressed.

BRIEF DESCRIPTION OF THE DRAWINGS

The foregoing and additional features and characteristics of this disclosure will become more apparent from the following detailed descriptions considered with the reference to the accompanying drawings, wherein:

FIG. 8 is a schematic sectional view of a display device of the background art.

DETAILED DESCRIPTION

Figure 1:
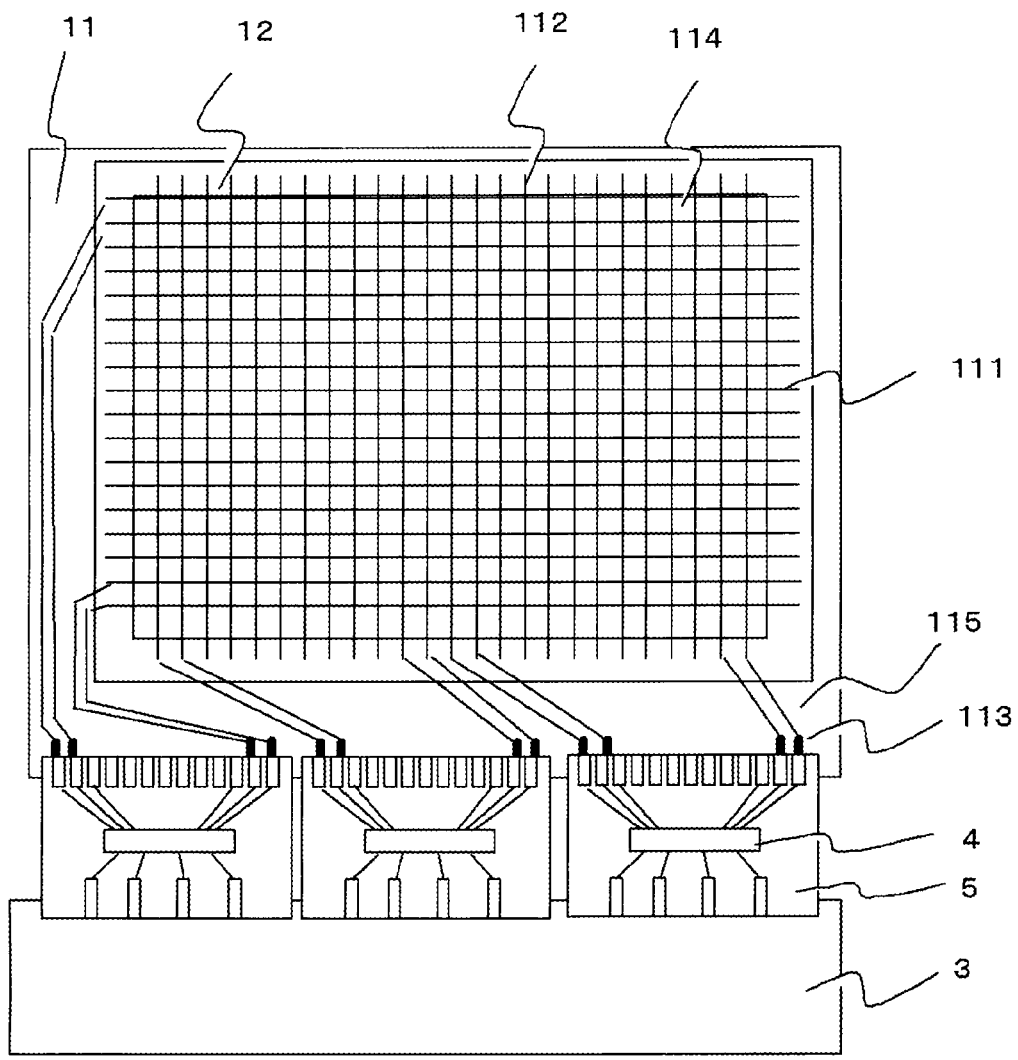
FIG. 1 is a schematic plan view of a display device according to an illustrative embodiment of this disclosure.

Hereinafter, illustrative embodiments of the display device of this disclosure will be described with reference to the drawings. Meanwhile, in the respective drawings, the substantially same constitutional elements are denoted with the same reference numerals.

First Illustrative Embodiment

Figure 2:
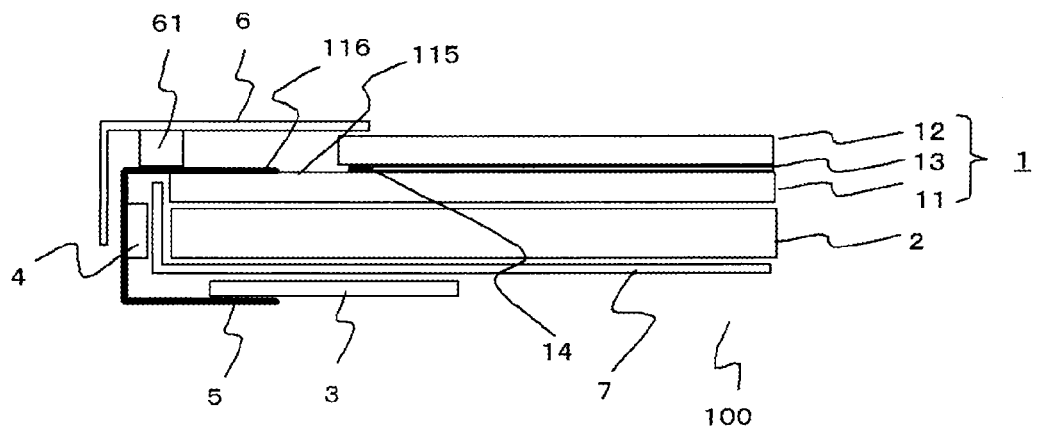
FIG. 2 is a sectional view illustrating a state where a frame is arranged at the display device of FIG. 1.

FIG. 1 is a schematic plan view of a display device that is used in this disclosure, and FIG. 2 is a sectional view illustrating a state where a frame is arranged at the display device of FIG. 1.

First, a configuration of the display device of this disclosure is briefly described. As shown in FIG. 1 or 2, a display element 1 that is used for a display device 100 of this disclosure uses a liquid crystal display panel configured by a TFT array substrate, which is a first substrate 11, a counter substrate, which is a second substrate 12 arranged to face a display area of the first substrate 11, liquid crystals 13 sandwiched in a gap between the substrates overlapping with each other, and a seal 14 provided at the periphery of the substrates so as to suppress the liquid crystals 13 from being leaked.

Also, the display element 1 has a display area 114, which is configured by pixels formed by a plurality of horizontal wirings 111 and vertical wirings 112 intersecting with the horizontal wirings 111, and a peripheral area 115 beyond the display area 114, which is provided so as to input signals to the respective wirings. Wirings 113 that are formed in the peripheral area 115 and extend from the wirings in the display area 114 are connected to a flexible substrate 5 having a driving IC 4 mounted thereon. The flexible substrate 5 is connected to a circuit substrate 3 that supplies display signals to the pixels configured in the display area 114. The display signal generated from the circuit substrate 3 is input to the driving IC 4 mounted on the flexible substrate 5. The driving IC 4 converts the input display signal into a signal having a level and timing suitable for driving of the display element 1 and outputs the same to the first substrate 11.

Also, in order to transmit the signal of the driving IC 4 to the first substrate 11 and the circuit substrate 3, a wiring pattern (not shown) is provided on the flexible substrate 5.

Also, the display device 100 has a backlight 2, which is a light source illuminating a backside of the display element 1. The display element 1 and the backlight 2 are accommodated in a first frame 6 and a second frame 7. The circuit substrate 3 that inputs the display signal to the display element 1 is connected to the flexible substrate 5 and is arranged at the rear of the backlight 2.

The flexible substrate 5 that is connected to the first substrate 11 of the display element 1 is made of a flexible material, is arranged at a backside of the first frame 6 with being curved to sandwich the display element 1 and the backlight 2. Also, the second frame 7 having an opening is arranged at a display surface-side of the display element 1 to fix members configuring the display device with the first frame 6.

In the display device 100 of this disclosure, a flexible substrate holding member that protrudes to face the flexible substrate 5 is provided for the first frame 6, which is arranged at the display surface-side of the display element 1, and located in the vicinity of a connection part 116 with the flexible substrate 5, which connected in the peripheral area 115 of the display element 1. In the first illustrative embodiment, the flexible substrate holding member is a convex member 61 having a flat surface. In the meantime, the flat surface of the convex member 61 is configured to press the flexible substrate 5 at a position except for a part at which the driving IC is mounted. In other words, the position is different from a position corresponding to the driving IC mounted on the flexible substrate.

Here, an configuration of the flexible substrate 5 of the conventional structure is described with reference to a sectional view of the display device shown in FIG. 8, as regards the problems of the background art. As shown in FIG. 8, the flexible substrate 5 between the driving IC 4 and a vicinity of a connection part 54 of the first substrate 11 and the flexible substrate 5 is applied with a force from the outside, so that the flexible substrate 5 is formed with a bent portion 52 having a wave-like shape. Furthermore, stress 53 trying to expand the bent portion 52 is caused in the flexible substrate 5 and is applied to the vicinity of the connection part 54 at which the flexible substrate 5 is connected with the first substrate 11. Thereby, the first substrate 11 may be deformed, so that a gap (an interval) between the first substrate 11 and the second substrate 12 may be non-uniform. Typically, the gap (interval) between the first substrate 11 and the second substrate 12 is kept with accuracy of about 1 micron or smaller. Even in deformation of about 1 micron on the first substrate 11 due to the stress 53 by the bent portion 52, it may cause the display unevenness.

According to this disclosure, as shown in FIG. 2, the first frame 6, which is arranged at an outer side of the flexible substrate 5, is provided with the convex member 61 that protrudes to face the flexible substrate 5 and has a flat surface, as the flexible substrate holding member. The convex member 61 is arranged to face the first substrate 11 and the connection part 116 having the flexible substrate 5 mounted thereto. According to this configuration, the convex member 61 is contacted to the flexible substrate 5 to thus suppress the stress 53 (refer to FIG. 8), which is generated in the direction of expanding the curvature part, 52 in the flexible substrate 5. As a result, the force with which the flexible substrate 5 presses the display element 1 is weakened. Also, even in case where the external force such as vibration is applied, a force with which the flexible substrate 5 is separated from the display device 1 is also weakened. Therefore, it is possible to suppress the display unevenness of the display element 1 by suppressing the unevenness of the gap interval between the first substrate 11 and the second substrate 12, which is caused due to the deformation of the first substrate 11. In the meantime, the flat surface of the convex member 61 is configured to press the flexible substrate 5 at the position except for the part at which the driving IC is mounted, so that it can directly restrain the flexible substrate 5. Also, since the deformation due to the vibration is reduced, it is possible to suppress the reduction in the lifespan of the flexible substrate 5.

Also, the flexible substrate 5 is provided with the wiring pattern made of cupper, and the like, having high heat conductivity, and thus the heat generated from the driving IC 4 can be thus transferred to the first frame 6 through the connection part 116 via the wiring pattern of the flexible substrate 5. Thus, it is possible to suppress the heat of the driving IC 4 from being transferred to the display element 1. Thereby, the characteristics of the driving IC and the liquid crystals are suppressed from being deteriorated, so that it is possible to suppress the display unevenness occurring in the display device.

Second Illustrative Embodiment

Figure 3:
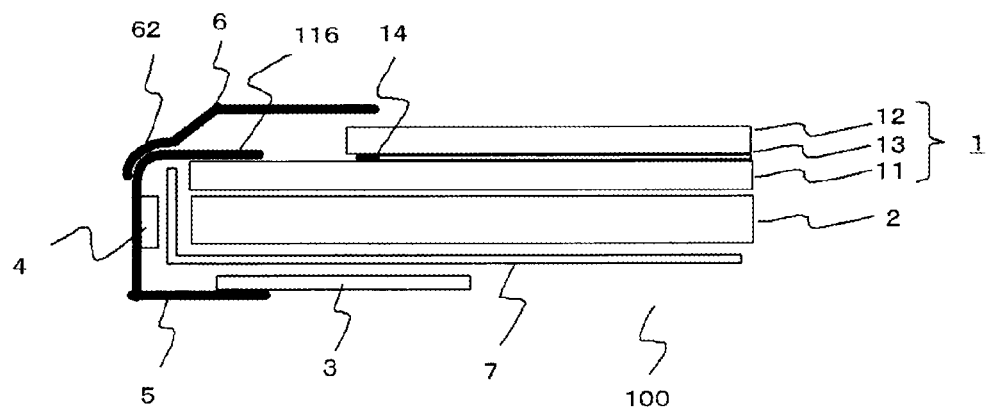
FIG. 3 is a sectional view of a display device according to a second illustrative embodiment.

FIG. 3 is a sectional view of a display device according to a second illustrative embodiment. In the second illustrative embodiment, instead of the configuration where the first frame 6 is provided with the convex member 61, the first frame 6 is provided with a curvature part 62 that is curved towards the outside of the display device 100 at a position facing the flexible substrate 5 that is arranged in the vicinity of an end portion of an opening-side of the second frame 7 holding the backlight 2 and/or the display element 1, and the flexible substrate 5 is arranged to face the curvature part 62. The first frame 6 is provided with the curvature part 62, and the flexible substrate 5, which is arranged at the end portion of the opening-side of the second frame 7, is arranged to face the curvature part 62, so that the load to be applied to the connection part 116 is suppressed. Therefore, it is possible to restrain the flexible substrate 5 from being curved in a wave-like shape, thereby suppressing the stress that is transferred from the flexible substrate 5 to the first substrate 11.

Third Illustrative Embodiment

Figure 4:
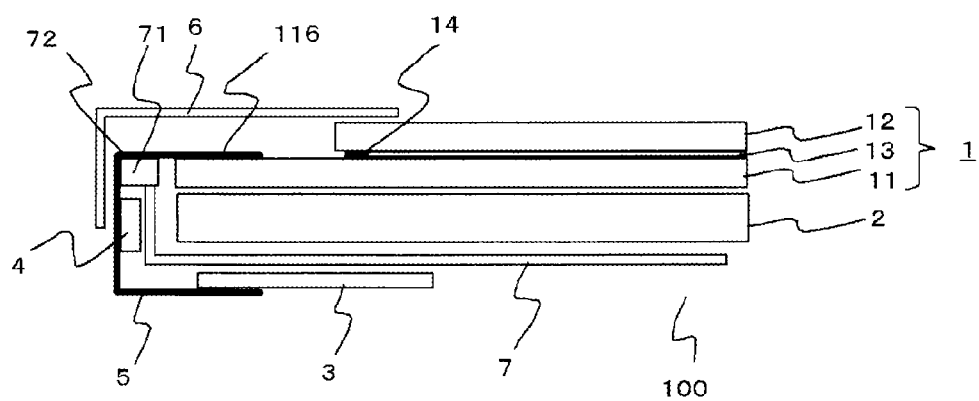
FIG. 4 is a sectional view of a display device according to a third illustrative embodiment.

FIG. 4 is a sectional view of a display device according to a third illustrative embodiment.

In the third illustrative embodiment, instead of providing the convex member 61 or curvature part 62 for the first frame 6, like the first and second illustrative embodiments, the opening of the second frame 7 is provided with a convex member 71 for restraining the flexible substrate 5.

As shown in FIG. 4, the second frame 7 is provided with the convex member 71 having a flat surface 72 at a position facing the flexible substrate 5 arranged at the opening of the second frame 7. According to this configuration, the bent portion 52 (refer to FIG. 8) of a wave-like shape of the flexible substrate 5 near the first substrate 11 and the mounting terminal part 54 of the flexible substrate 5 is suppressed, and it is possible to flatten the flexible substrate, so that the stress to be applied to the first substrate 11 is reduced. In the meantime, the flat surface 72 is preferably formed to be parallel with the connection part 116 of the first substrate 11 of the display element 1 with the flexible substrate 5. In the meantime, when the convex member 71 is formed at the position substantially parallel with the connection part 116 with the flexible substrate 5, the load to be applied to the connection part 116 can be suppressed to further reduce the stress that is applied to the first substrate 11.

Also, since the flexible substrate 5 is provided with the wiring pattern (not shown) made of copper and the like having high heat conductivity, the heat generated from the driving IC 4 is radiated to the second frame 7 through the contact part with the convex member 71 of the second frame 7 via the wiring pattern of the flexible substrate 5.

Figure 5:
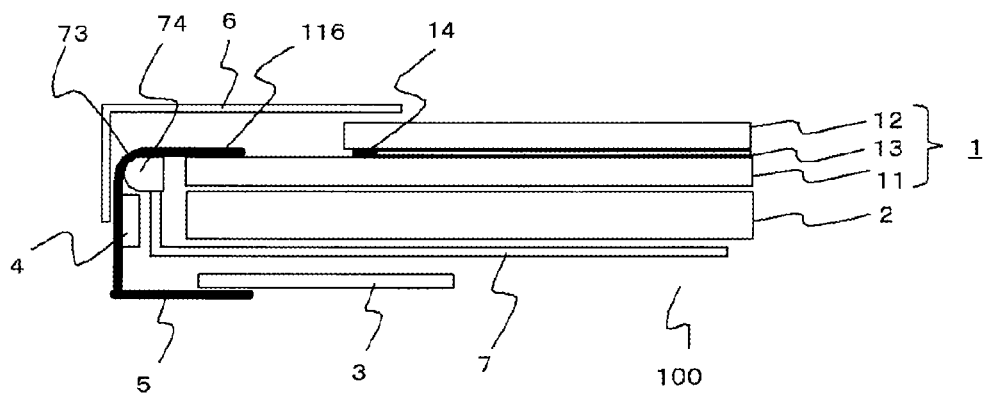
FIG. 5 is a sectional view of a display device according to a modified third illustrative embodiment.

FIG. 5 shows a modified embodiment of the third illustrative embodiment. As shown in a sectional view of the display device of FIG. 5, the convex member formed at the second frame 7 may be a curved part 74 having a curved surface 73, rather than the convex member 71 having the flat surface 72. As shown in FIG. 5, since the curved surface 73 is arranged to face the flexible substrate 5, the bending of a wave-like shape of the flexible substrate 5 is suppressed in the vicinity of the connection part 116 with the flexible substrate 5, and thus the flexible substrate 5 is flattened. As a result, the stress that is applied to the first substrate 11 can be reduced.

Fourth Illustrative Embodiment

Figure 6:
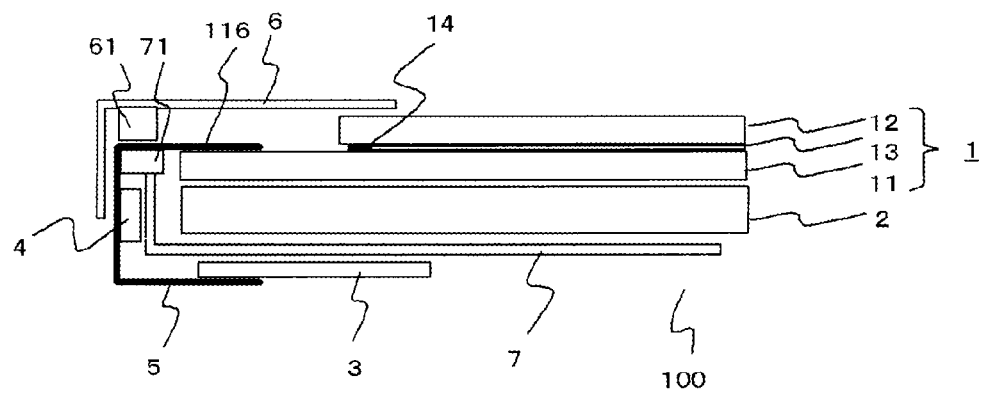
FIG. 6 is a sectional view of a display device according to a fourth illustrative embodiment.

FIG. 6 is a sectional view of a display device according to a fourth illustrative embodiment. In the fourth illustrative embodiment, the first frame 6, which is arranged at the outer side of the flexible substrate 5, and the second frame 7, which is arranged at the inner side of the flexible substrate 5, are respectively provided with the convex member 61 and the convex member 71 each of which has the flat surface. The flexible substrate 5 is held with being sandwiched between the convex parts in the vicinity of the connection part 116 to the first substrate 11, so that it is possible to suppress the bending of a wave-like shape of the flexible substrate 5 more securely. Therefore, the flexible substrate 5 is flattened, so that the stress to be transferred to the first substrate 11 is reduced.

Since the flexible substrate 5 is provided with the wiring pattern (not shown) made of copper and the like having high heat conductivity, the heat generated from the driving IC 4 is radiated to the first frame 6 and/or the second frame 7 through the contacts with the convex parts of the frames at the outer and inner sides via the wiring pattern of the flexible substrate 5.

Figure 7:
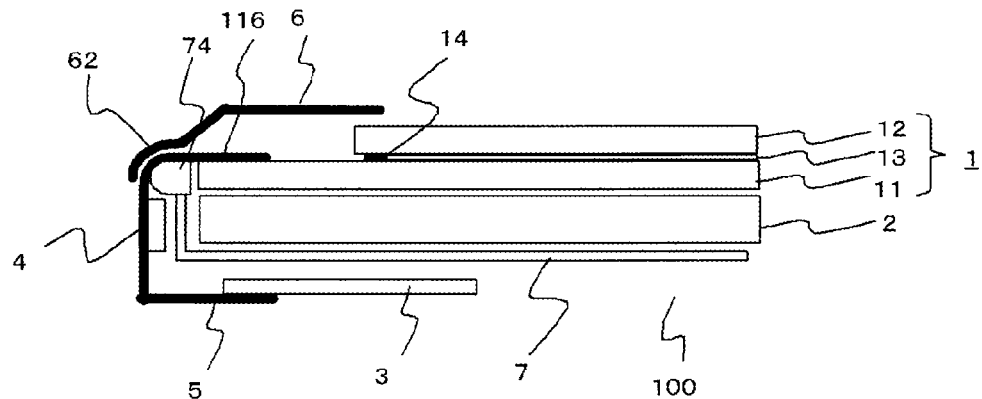
FIG. 7 is a sectional view of a display device according to a modified fourth illustrative embodiment.
Figure 7:
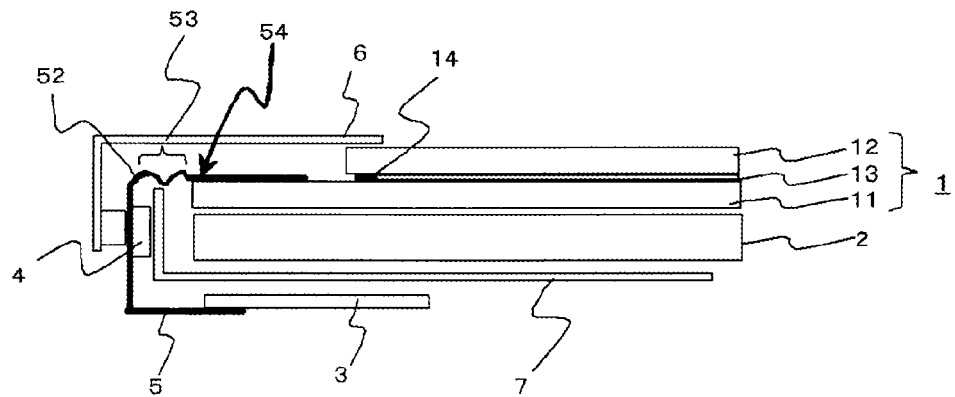

FIG. 7 shows a modified embodiment of the fourth illustrative embodiment. As shown in a sectional view of the display device of FIG. 7, the convex parts formed at the first frame 6 and the second frame 7 may be curved parts having a curved surface, rather than the flat surface. Like this, since the curved surfaces 73 face the flexible substrate 5, the bending of a wave-like shape of the flexible substrate 5 is suppressed in the vicinity of the connection part 116 with the flexible substrate 5 and the flexible substrate 5 is flattened. As a result, the stress that is applied to the first substrate 11 can be reduced.

What is claimed is:

1. A display device comprising:
   a display element, which has a display area and a peripheral area;
   a flexible substrate, which has flexibility and which is arranged in the peripheral area of the display element, and on which a driving IC supplying a signal to the display area is mounted;
   a first frame, which is arranged at a display surface-side of the display element; and
   a second frame, which is engaged with the first frame to thus hold the display element and the flexible substrate,
   wherein the display element has a connection part connecting with the flexible substrate,
   wherein the first frame is provided with a flexible substrate holding member that is located at a position, which faces a vicinity of the connection part and is different from a position corresponding to the driving IC mounted on the flexible substrate, and
   wherein the flexible substrate holding member is located at the position between the driving IC and the connection part.

2. The display device according to claim 1,
   wherein the flexible substrate holding member is a convex member that protrudes towards the display element, and a surface of the convex member facing the connection part has a flat surface.

3. The display device according to claim 1,
   wherein a portion of the flexible substrate holding member is formed to correspond with the flexible substrate arranged at an end portion of the second frame, and the corresponding portion has a curved surface.

4. The display device according to claims 1, wherein the driving IC on the flexible substrate is located to face at least one of a side portion of the first frame and a side portion of the second frame.

5. A display device comprising:
   a display element, which has a display area and a peripheral area;
   a flexible substrate, which has flexibility and is arranged in the peripheral area of the display element, and on which a driving IC supplying a signal to the display area is mounted;
   a first frame, which is arranged at a display surface-side of the display element; and
   a second frame, which has an opening and is engaged with the first frame to thus hold the display element and the flexible substrate,
   wherein the display element has a connection part connecting with the flexible substrate,
   wherein the second frame is provided with a flexible substrate holding member that is formed at a position, which faces the flexible substrate arranged at an end of the opening of the second frame and is different from a position corresponding to the driving IC on the flexible substrate, and
   wherein the flexible substrate holding member is located at the position between the driving IC and the connection part.

6. The display device according to claim 5,
   wherein the flexible substrate holding member is a convex member that protrudes towards the first frame, and a surface of the convex member facing the connection part has a flat surface.

7. The display device according to claim 5,
   wherein the flexible substrate holding member is a convex member that protrudes towards the first frame, and a surface of the convex member facing the connection part has a curved surface.

8. The display device according to claims 5,
   wherein the first frame is further provided with a flexible substrate holding member at a position facing the flexible substrate holding member formed at the second frame, and the flexible substrate is held being sandwiched between the flexible substrate holding members formed at the first frame and the second frame.

9. The display device according to claims 5, wherein the driving IC on the flexible substrate is located to face at least one of a side portion of the first frame and a side portion of the second frame.

* * * * *